United States Patent Office

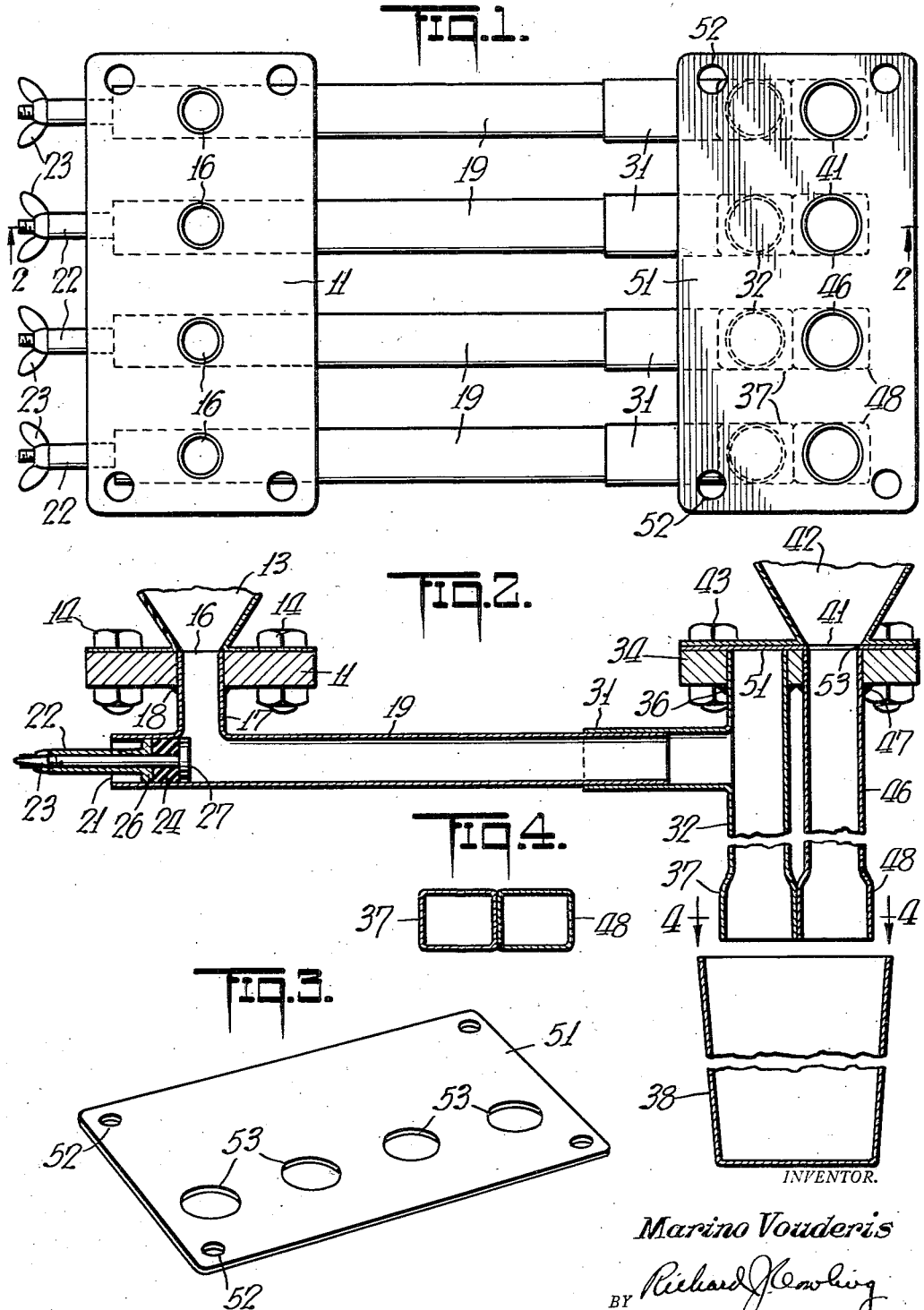

2,803,381
Patented Aug. 20, 1957

2,803,381

DISPENSING UNIT FOR MAKING TWO FLAVORED CONFECTIONS

Marino Vouderis, Jackson Heights, N. Y., assignor to Joe Lowe Corporation, New York, N. Y., a corporation of Delaware Application March 10, 1954, Serial No. 415,223

4 Claims. (Cl. 222—135)

The present invention relates generally to apparatus for measuring and filling containers with a semi-frozen substance, and it has particular relation to a filling nozzle attachment for conventional cup filling machines for dispensing measured quantities of contrasting substances into a single container or mold cavity for making frozen confection-on-a-stick.

There are many different types of nozzles for dispensing one or more flavors or contrasting colors of soft ice cream into individual containers or for forming a variegated ice cream substance and then dispensing the composite material into containers or molds. Most of these nozzles combine the several substances within the final discharge or delivery tube, which is within a confined area, but such nozzles cannot be used satisfactorily to make a two flavored frozen confection where a clean longitudinal line of demarcation is desired between the two substances forming the confection. When two or more substances are extruded from a single discharge tube into an individual container or mold cavity, having a much larger cross-sectional area than the end of the discharge or delivery tube, there is a tendency for the substances to spread out towards the sides of the container during the filling operation, causing an intermixing which leaves no definite line of division between the several substances.

The present invention overcomes the intermixing tendencies of the aforementioned nozzles and provides a new, novel and efficient attachment for a conventional cup filling machine that will permit the discharge of a plurality of different or contrasting substances into the individual cavities of a conventional frozen confection mold, whereby a two flavored frozen confection-on-a-stick may be formed having a definite line of demarcation between the different or contrasting substances.

An object of the present invention is to provide a novel, efficient and inexpensive nozzle attachment for a cup filling machine capable of handling two different or contrasting materials, which may render it useful for filling conventional frozen confection molds simultaneously with different materials.

Another object of the invention is the provision of a sanitary nozzle, which is easily and quickly attached and detached from said filling machine and readily assembled and disassembled for cleaning purposes.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Figure 1 is a top plan view of an assembled nozzle attachment made in accordance with the principles of the invention;

Figure 2 is a longitudinal sectional view of the nozzle attachment shown in Figure 1, the same having been taken substantially along the line 2—2 thereof, looking in the direction of the arrows, and showing also the manner in which the assembly is attached to the bottoms of the hoppers of a conventional cup filling machine, which provides the filling pressures and sources of supply, and also showing the manner in which the materials are to be discharged into a single open-top mold cavity;

Figure 3 is a perspective view of a distribution plate which is adapted to be mounted between the attaching plate and the bottom of the second hopper and serves to close up the open tops of the discharge tubes leading from the first hopper; and Figure 4 is a cross-sectional view of the discharge ends of the nozzle, the same being taken substantially along the line 4—4 of Figure 2, looking in the direction of the arrows.

It will be noted in the illustrations shown that the nozzle attachment has been designed for use in filling the individual cavities of a conventional frozen stick confection mold (not shown complete), which contains four laterally spaced rows of six individual cavities each, which rows are so spaced that one outlet opening from each hopper will be centrally over one cavity of each row as the mold is passed therebelow.

Referring now to Figure 2, the mounting plate 11 is designed to be attached to the bottom of a hopper 13 by means of suitable bolts and nuts 14. Each of the inlet openings 16, extending vertically through the mounting plate 11, is aligned with a discharge outlet in the bottom of the hopper 13 and has a short depending receiving tube 17 mounted fixedly therein, as by welding as indicated at 18. Each tube 17 is, in turn, formed integrally with a longitudinally extending horizontal tube 19 at a point spaced intermediate the ends thereof. The short ends of each of the tubes 19 has an open end 21, which is adapted to receive removably a conventional plug valve 22 for facilitating cleaning of the assembly.

Each plug valve 22 is made in a sanitary manner whereby it may be easily and quickly removed from its open end 21 of its tube 19 for cleaning purposes by merely unloosing the wing nuts 23, which permits the assembled valve to be withdrawn from the tube 19. When the plug valve 22 is to be re-inserted, it is moved slidably into its desired position within the open end of the tube 19 and the wing nut 23 is tightened, thereby compressing the sanitary plastic or rubber gasket 24 between the metal disks 26 and 27, causing it to be expanded diametrically and provide a frictional binding contact with the adjacent innersides of the tube 19 forming a liquid tight fit therebetween.

The delivery ends of each of the tubes 19 fit telescopically within a horizontally disposed connecting tube 31, which, in turn, is formed integrally with a vertical depending discharge tube 32, having an open top welded into an attaching plate 34, as indicated at 36. The lower or opposite end of the depending tube 32 is flared outwardly adjacent its discharge end 37, which end has a cross-sectional area corresponding somewhat in shape, but only slightly smaller in width and length, to approximately one-half of the cross-sectional area of the individual mold cavity 38 it is designed to fill.

The attaching plate 34, which is adapted to be secured removably under the discharge outlets 41 of the second hopper 42 by means of bolts and nuts 43, has a corresponding series of spaced openings into which are mounted discharge or delivery tubes 46, as by welding as indicated at 47. The discharge or delivery tubes 46 depending downwardly and parallel to the discharge or delivery tubes 32 are connected with the hopper 42. They are of equal size and shape, and spaced so that each tube 46 is paired with a tube 32 with their respective delivery ends juxtaposed. The delivery tubes 46 also have their lower delivery ends flared, as indicated at 48, and correspond in shape but being slightly smaller in width and length to one-half of the cross-sectional area of the individual mold cavity it is designed to fill.

A distributing plate member 51, which is best shown in Figure 3, has a single aperture adjacent each corner, as indicated at 52, and is adapted to be mounted between the bottom of the hopper 42 and the attaching plate 34 by means of the bolts and nuts 43, as best shown in Figure 2. The plate 51 has a series of longitudinally spaced openings 53 along one side thereof, corresponding in size, shape and spacing to the discharge outlets 41 in the bottom of the hopper 42. The plate 51 has no openings therethrough corresponding to the open tops of the delivery tubes 32, and therefore serves to close off the top open ends of said tubes to prevent the material passing therethrough to be discharged upwardly therefrom. Obviously, when the attachment is disconnected from the bottom of the hopper 42; the distributing plate 51 is separable therefrom and permits and facilitates cleaning of the tubes 32 from either end.

In the operation of the attachment, it will be understood that the materials from the receiving hoppers 13 and 42 are delivered into their respective discharge or delivery tubes 32 and 46 under synchronized, even and intermittent pressures. It is necessary to provide for a predetermined quantity of the edible material being delivered intermittently in order to permit movement of the mold structure to remove a filled row of mold cavities and replace it with an unfilled row of such cavities or an entirely new mold.

The amount of material being delivered by the filling apparatus from the spaced hoppers 13 and 42 are equal to and predetermined by the capacity of the individual cavity of the frozen confectionery mold being filled. The material from the hopper 13, passing into the tube 17, through the connecting tubes 19 and 31 and into the delivery or discharge tube 32, is discharged from its lower outwardly flared end. In this apparatus, it is not necessary to provide a sealing gasket within the telescopic fit between the connecting tubes 19 and 31. A close sliding fit is sufficient since the material passing through is of a high viscosity and there is no substantial amount of back pressure on said material to give it a tendency to back feed and seek other openings.

With the apparatus of this invention having juxtapositioned discharge nozzles each substantially equal in size to one-half of the cross-sectional area of the bottom of an individual cavity of a frozen confectionery mold, and of a substantially corresponding shape, it has been discovered that two semi-solid substances, like semi-frozen ice cream, semi-frozen sherbet and the like, which are of a high viscosity, will have no tendency to intermix when extruded from such duplicate nozzles adjacent the open top of the individual mold cavity. The discharge ends of the nozzles 37 and 48 need not be inserted down to the bottom of said mold cavity or even directly into and below the open top thereof, but, if they are positioned directly over said cavities, their extrusions will not tend to intermix leaving a ragged line of demarcation between the different substances. The individual cavities of a multiple cavity mold of the type used in the manufacture of frozen confections have downwardly tapered sidewalls to permit a clearance withdrawal for the frozen edible product after the defrosting operation. The slight difference in size between the lower and upper ends of the mold cavities does not prevent the formation of a clean line of demarcation between the two substances substantially the entire length of the confectionery product when frozen.

Although I have only described in detail one form which the invention may assume, it will be readily apparent to those skilled in the art that various modifications may be made therein without departing from the spirit thereof or from the scope of the appended claims.

What I claim is:

1. A dispensing unit readily attachable and detachable to a pair of supply hoppers adapted to hold quantities of different materials to be discharged therefrom, comprising a first plate member having a series of spaced apertures extending therethrough, each aperture of said plate member having a delivery tube extending downwardly and away therefrom, a second plate member having a series of spaced apertures extending therethrough, said apertures arranged in rows with the apertures of each row corresponding in number to the apertures in the first plate member, a cover plate for closing off one row of apertures in the second plate member, a series of delivery tubes depending one each from said apertures in the second plate member, the tubes depending from the closed row of apertures in the second plate member each having a lateral extension for connection with the delivery tubes extending away from the first plate member, and the delivery tubes depending from the second plate member being arranged in pairs with one tube from each row forming a pair.

2. A dispensing unit readily attachable and detachable to a pair of supply hoppers holding quantities of different materials to be discharged therefrom, comprising a first plate member having a series of apertures therethrough arranged in spaced relation in a longitudinal row, each aperture of said first plate member having a delivery tube extending downwardly and away therefrom, a second plate member having a series of apertures therethrough arranged in two spaced longitudinal rows, the number of apertures in each row corresponding to the number of apertures in the first plate member, a cover plate attachable over the top of said second plate member for closing off the apertures of one of said rows, a series of delivery tubes depending from each aperture in said second plate member, each of the tubes depending from the closed row of apertures having a lateral extension for connection with the tubes of the first plate member, the tubes depending from the second plate member being arranged in pairs with one tube of each longitudinal row forming a pair.

3. A dispensing unit readily attachable and detachable to a pair of supply hoppers holding quantities of different materials to be discharged therefrom, comprising a first plate member having a series of apertures therethrough arranged in spaced relation in a longitudinal row, each aperture of said first plate member having a delivery tube extending downwardly and away therefrom, a second plate member having a series of apertures therethrough arranged in two spaced longitudinal rows, the number of apertures in each row corresponding to the number of apertures in the first plate member, a cover plate attachable over the top of said second plate member for closing off the apertures of one of said rows, a series of delivery tubes depending from each aperture in said second plate member, each of the tubes depending from the closed row of apertures having a lateral extension, the end of each extension being slightly larger in cross-section than the delivery tubes from the first plate member for telescopic connection with the tubes of the first plate member, the tubes depending from the second plate member being arranged in pairs with one tube of each longitudinal row forming a pair.

4. A dispensing unit readily attachable and detachable to a pair of supply hoppers holding quantities of different materials to be discharged therefrom, comprising a first plate member having a series of apertures therethrough arranged in spaced relation in a longitudinal row, each aperture of said first plate member having a delivery tube extending downwardly therefrom, each of said delivery tubes connecting intermediate the ends of a lateral extension, one end of each extension being open for telescopic connection with a series of tubes from a second plate member and the other end being closed by a sanitary removable plug valve, a second plate member having a series of apertures therethrough arranged in two spaced longitudinal rows, the number of apertures in each row corresponding to the number of apertures in the first plate member, a cover plate attachable over the top of said second plate member for closing off the apertures of one of said rows, a series of delivery tubes depending from each aperture in said second plate member, each of the tubes depending from the closed row of apertures having a lateral extension for telescopic connection with the tubes of the first plate member, the tubes depending from the second plate member being arranged in pairs with one tube of each longitudinal row forming a pair.

References Cited in the file of this patent

UNITED STATES PATENTS 1,442,405　　Hawthorne ＿＿＿＿＿＿＿＿ Jan. 16, 1923